A. J. SMITH.
Bee Hive.
No. 33,499. Patented Oct. 15, 1861.
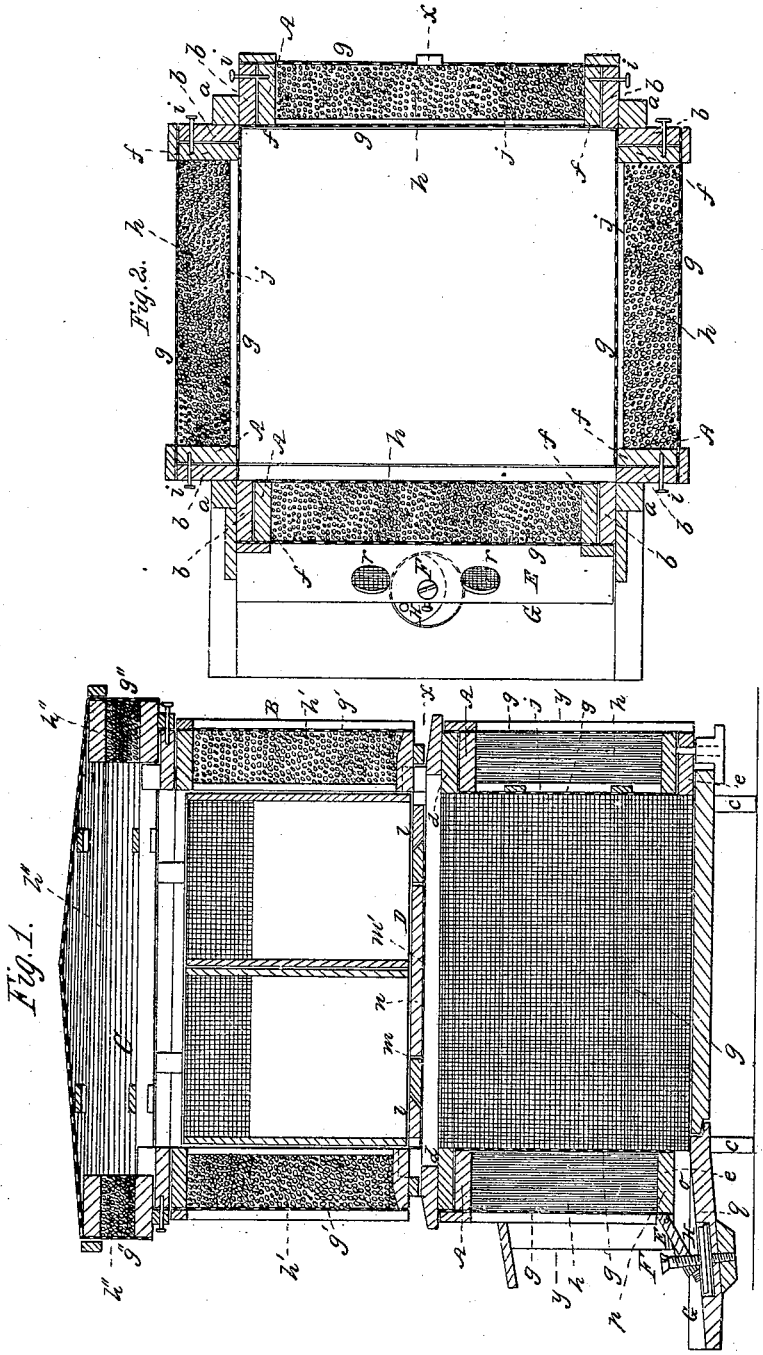

UNITED STATES PATENT OFFICE.

A. J. SMITH, OF DECORAH, IOWA.

IMPROVEMENT IN BEE-HIVES.

Specification forming part of Letters Patent No. 33,499, dated October 15, 1861.

*To all whom it may concern:*

Be it known that I, A. J. SMITH, of Decorah, in the county of Winneshiek and State of Iowa, have invented a new and Improved Bee-Hive; and I do hereby declare that the following is a full, clear, and exact description of the same, reference being had to the annexed drawings, making a part of this specification, in which—

Figure 1 is a vertical central section of my invention, taken in the line $x\,x$, Fig. 2; and Fig. 2, a horizontal section of the same, taken in the line $y\,y$, Fig. 1.

Similar letters of reference indicate corresponding parts in the two figures.

The object of this invention is to obtain a hive which may be very economically constructed, much better ventilated than usual, and also capable of affording greater protection against the bee-moth.

The invention also has for its object a convenient means for regulating the dimensions of the opening or passage-way into the hive, whereby the moth may not only be excluded, but also drones when desired and the queen-bee retained in the hive.

The invention consists, first, in the employment or use of wire-cloth with straw, hay, or other suitable non-conducting material arranged in connection with the wire-cloth to form the walls of the hive.

The invention consists, second, in a hinged or jointed flap applied to the front part of the hive and used in connection with an eccentric button, all being arranged as hereinafter fully shown and described to effect the results above mentioned.

To enable those skilled in the art to fully understand and construct my invention, I will proceed to describe it.

The hive may be of quadrilateral form and composed of a frame consisting of four uprights $a\,a\,a\,a$, with strips $b$ attached, two to each upright. (See Fig. 2.) One strip $b$ at each corner of the hive extends down sufficiently below the others to form feet $c$ for the hive. (See Fig. 1.) The uprights $a$ at their upper ends are connected by cross-caps $d$, and they are connected at their lower parts by cross-plates $e$. Between the strips $b\,b$ and cross plates and caps at each side of the hive there is fitted a rectangular frame A, the side pieces $f$ of which are about as wide as the strips $b$. These frames A fit snugly in the sides of the hive, and they are covered at their outer and inner sides with wire-cloth $g$, the space between being filled with straw, hay, or other good non-conducting substance $h$. By this arrangement the walls of the hive are rendered permeable to air and the hive will be well ventilated, while at the same time it will be warm and dry in winter and cool in summer.

Two of the frames A may be secured in proper position by means of pins or brads $i$, which may be readily removed to admit of the withdrawing of the frames when necessary for the purpose of inspecting the interior of the hive.

In case of moths entering the hive and depositing their eggs, the worms when hatched will be driven by the bees through the inner wire-cloth $g$, and when the worms are transformed into moths or millers they will perish within the walls of the hives, as the millers cannot pass through the mesh of the cloth. It would probably be preferable to allow a space $j$ between the inner wire-cloth $g$ and the filling $h$ to afford room for the worms. The upper part B of the hive may be made in the same way as the lower part, with the exception that no inner wire-cloth is necessary at the inner side. Slats $k$ may be used instead. The filling $h'$ and outer wire-cloth $g'$ are the same as those of the lower or main part of the hive. The cap C of the hive is arranged with a filling $h''$ both at its sides and top, the sides having a wire-cloth covering $g''$. (See Fig. 1.)

The top D of the main or lower part of the hive is provided with slides $l$ at its edge to admit of the bees passing from the lower to the upper part of the hive, and the center of the top D has an opening $m$ made in it, said opening being covered with wire-cloth $m'$. When no opening for ventilation or other purposes is required between the upper and lower parts of the hive, a cover $n$ is fitted in the opening $m$, as shown in Fig. 1.

At the front of the lower part of the hive, at its bottom, there is a recess or opening $o$, which extends the whole width of the hive and has a flap or door E attached by a hinge or joint $p$ to its upper edge. This flap or door has a screw F passing through it, by which the flap or door may be adjusted at any desired height to regulate the size of the passage-way into the hive, or to completely close it when desired. At the center of the alighting-board G of the hive, on which the flap or door E rests when closed, there is made a circular opening $q$, in which an eccentric button H is placed, the form of which is shown in Fig. 2.

When only a small entrance to the hive is required, the flap or door E is entirely closed and the button H turned so as to just admit one, two, or more bees into the hive, as may be required. By turning the button H so that its semicircular front will be in front, the entrance to the hive will be entirely closed. The flap or door E may have one or more holes $r$ made through it covered with wire-cloth to admit of ventilation when the flap or door is closed.

I do not claim, broadly, the employment or use of straw, hay, or other non-conducting substance applied to bee-hives irrespective of the arrangement herein shown and described, together with the use of wire-cloth; but I do claim as new, and desire to secure by Letters Patent, as an improved article of manufacture—

1. A bee-hive having its walls formed by straw, hay, or other similar fibrous non-conducting substance, and wire-cloth arranged within a suitable frame, substantially as and for the purpose set forth.

2. The adjustable flap or door E, in combination with the eccentric button H, placed within the recess or opening $q$ of the alighting-board G, and all arranged as and for the purpose specified.

A. J. SMITH.

Witnesses:
  H. S. WEISER,
  D. H. HUGHES.